United States Patent
Hild et al.

(10) Patent No.: US 9,580,517 B2
(45) Date of Patent: Feb. 28, 2017

(54) PROCESS FOR MANUFACTURING LITHIUM CARBOXYMETHYL CELLULOSE

(71) Applicant: Dow Global Technologies LLC, Midland, MI (US)

(72) Inventors: Alexandra Hild, Soltau (DE); Hans-Juergen Juhl, Bad Fallingbostel (DE); Roland Adden, Bomlitz (DE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/781,322

(22) PCT Filed: May 28, 2014

(86) PCT No.: PCT/US2014/039640
§ 371 (c)(1),
(2) Date: Sep. 30, 2015

(87) PCT Pub. No.: WO2014/197242
PCT Pub. Date: Dec. 11, 2014

(65) Prior Publication Data
US 2016/0102153 A1   Apr. 14, 2016

Related U.S. Application Data

(60) Provisional application No. 61/830,659, filed on Jun. 4, 2013.

(51) Int. Cl.
*C08B 11/12* (2006.01)
*C08B 15/00* (2006.01)

(52) U.S. Cl.
CPC .............. *C08B 11/12* (2013.01); *C08B 15/00* (2013.01)

(58) Field of Classification Search
CPC .............................. C08B 11/12; C08B 15/00
USPC .................................................. 536/98, 124
See application file for complete search history.

(56) References Cited

U.S. PATENT DOCUMENTS

2010/0239915 A1   9/2010   Hochgatterer et al.

FOREIGN PATENT DOCUMENTS

| CN | 102206286 | 10/2011 |
| JP | 2008019344 A | 1/2008 |
| JP | 2010070686 A | 4/2010 |

OTHER PUBLICATIONS

Search report from corresponding Japanese 2016-515144 application, dated Oct. 20, 2016.
Search report from corresponding Chinese 201480029270.3 application, dated Oct. 12, 2016.
"Environmental Biotechnology (the first version)", Jian Chen, p. 248-249, China Liaht Industry Press with English translation.
Abuh-Lebdeh Lavoie, et al., Journal of Power Sources, 196 (2011) 2128-2134.
Abuh-Lebdeh, Courtel, et al., Journal of Power Sources, 213 (2012) 249-254.
Machado, G.D. et al., Polimery, 48, 4 (2003) 273-279.

*Primary Examiner* — Sudhakar Katakam
*Assistant Examiner* — Everett White
(74) *Attorney, Agent, or Firm* — Steven W. Mork

(57) ABSTRACT

Prepare lithium carboxymethyl cellulose by treating sodium carboxymethyl cellulose with a weak acid to form an acid from of carboxymethyl cellulose and then treating the acid form of the carboxymethyl cellulose with lithium chloride.

7 Claims, No Drawings

PROCESS FOR MANUFACTURING LITHIUM CARBOXYMETHYL CELLULOSE

BACKGROUND OF THE INVENTION

Field of the Invention

The present invention relates to a method for manufacturing lithium carboxymethyl cellulose.

Introduction

Lithium carboxymethyl cellulose (Li-CMC) is a possible binder material for use in lithium ion (Li-ion) batteries. Traditional binder systems typically have used polyvinylidene fluoride (PVDF) as a polymeric binder and N-methyl-2-pyrrolidone (NMP) as a solvent for the binder. The fluorinated binder and hazardous solvent prove challenging to safely handle and dispose. Li-CMC is an alternative binder that can be delivered using an aqueous solvent. As a result, use of a Li-CMC binder can reduce the hazards associated with the binder system of Li-ion batteries and disposal concerns associated with both the binder and the solvent. However, manufacturing Li-CMC can be challenging.

Carboxymethyl cellulose (CMC) is commonly available as a sodium salt (Na-CMC) due to specific manufacturing conditions that include alkalization of cellulosic raw material with caustic soda followed by etherification and neutralization. Therefore, essentially all commercially available CMC is Na-CMC.

CN102206286A discloses a method for converting Na-CMC to Li-CMC using hydrochloric acid. The reference discloses treating Na-CMC with an aqueous hydrochloric acid solution and then treating the resulting acid form of CMC (H-CMC) with an aqueous lithium hydroxide solution to achieve Li-CMC. Unfortunately, treating Na-CMC with hydrochloric acid (a strong acid) generally degrades the CMC polymer and risks corrosion of processing equipment. Additionally, the resulting Li-CMC requires a drying step that can cause crosslinking by re-esterification of the carboxylate groups.

Other methods for converting Na-CMC to Li-CMC include treating with a concentrated aqueous lithium hydroxide solution followed by etherification with chlorine acetic acid. (see, e.g., Machado, G. D. et al., Polimery, 48, 4 (2003) 273-279; and Abuh-Lebdeh et al., Journal of Power Sources, 196 (2011) 2128-2134). However, lithium hydroxide has insufficient strength to fully solubilize the cellulose chain for the subsequent etherification step. It is also known to prepare Li-CMC using an ion exchange column. (See, Abuh-Lebdeh et al, Journal of Power Sources, 213 (2012) 249-254). However, an ion exchange column process is a low volume process that can only produce small quantities of Li-CMC.

There is a need for a less challenging method for manufacturing Li-CMC that does not suffer from the handicaps of the prior art.

BRIEF SUMMARY OF THE INVENTION

The present invention offers a method for manufacturing Li-CMC that avoids the process challenges of the prior art. The process of the present invention does not require use of strong acid such as hydrochloric acid or the use of lithium hydroxide solution followed by chlorine acetic acid or use of an ion exchange column.

Surprisingly, the present invention is a result of discovering that treating Na-CMC with a weak acid to form the CMC acid followed by treating the CMC acid with lithium chloride effectively produces Li-CMC in a safe, cost-effective manner without the problems associated with the prior art.

In a first aspect, the present invention is a process comprising the following steps: (a) treating sodium carboxymethyl cellulose with a weak acid to form an acid form of carboxymethyl cellulose; and (b) treating the acid form of carboxymethyl cellulose with lithium chloride to form lithium carboxymethyl cellulose

DETAILED DESCRIPTION OF THE INVENTION

"Multiple" means two or more. "And/or" means "and, or as an alternative". All ranges include endpoints unless otherwise indicated. All volume percents are determined at 23 degrees Celsius (° C.).

The process of the present invention requires treating sodium carboxymethyl cellulose (Na-CMC) with a weak acid to form an acid form of carboxymethyl cellulose (H-CMC). Weak acids are acids that incompletely ionize when dissolved in water. Examples of weak acids include acetic acid, formic acid, hydrofluoric acid, hydrocyanic acid, nitrous acid and hydrogen sulfate ion. A particularly desirable weak acid for use in this step for the present invention is acetic acid. Weak acids are in contrast to strong acids. Strong acids fully dissociate upon dissolving in water. Examples of strong acids include hydrochloric acid, nitric acid, sulfuric acid, hydrobromic acid, hydroiodic acid and perchloric acid. Desirably, the process of the present invention is free of strong acid during the formation of H-CMC. Preferably, the entire process of the present invention is free of strong acid.

The Na-CMC desirably has a degree of substitution that is 0.4 or more, preferably 0.5 or more, still more preferably 0.6 or more and at the same time desirably is 2.0 or less, preferably 1.6 or less, more preferably 1.3 or less. Having a degree of substitution in this range ensures that it is water soluble.

Degree of substitution for Na-CMC refers to the average number of hydroxyl (OH) groups in one anhydroglucose unit that have been substituted with another group. Determine degree of substitution according to ASTM D 1439-03 "Standard Test Methods for Sodium Carboxymethylcellulose; Degree of etherification, Test Method B: Nonaqueous Titration". In brief, the method involves treating a solid sample of Na-CMC with glacial acetic acid at boiling temperature to cause a release of acetate ion equivalent to the sodium carboxymethyl groups. These acetate ions are titrated as a strong base in anhydrous acetic acid using a perchloric acid standard solution. Determine the titration end point potentiometrically. Other alkaline salts of carboxylic acids (for example, sodium glycolate and di-sodium diglycolate) behave similarly and are co-titrated.

Generally, treatment of Na-CMC with a weak acid to form H-CMC is done in an aqueous solution where Na-CMC and weak acid are added to an aqueous solvent. For example, one method of treating Na-CMC with a weak acid within the scope of the present invention is by dispersing Na-CMC into a solvent to form an initial dispersion and then adding weak acid to the initial dispersion. The solvent comprises water and one or more than one organic co-solvent that is miscible or soluble with water. Desirable co-solvents include any one or combination of more than one of alcohols and acetone. Suitable alcohols for use as co-solvents include one or any combination of more than one selected from methanol, ethanol, n-propanol and iso-propanol as well as butanol isomers. The aqueous solvent consists of water and co-solvent. Co-solvent typically accounts for 70 volume-percent (vol %) or more, preferably 80 vol % or more and can be 90 vol % or more and at the same time typically accounts for 95 wt % or less, and can be 90 wt % or less, 85 wt % or less and even 80 wt % or less based on total solvent volume. At the same time, water typically accounts for 5 wt % or more, preferably 10 wt % or more and can be 15 wt % or more while at the same time typically accounts for 30 vol % or less, preferably 20 vol % or less and can be 10 vol % or less based on total solvent volume. Determine wt % of water and co-solvent relative to combined weight of water and co-solvent.

The temperature of the conversion of Na-CMC to H-CMC is not critical as long as it is below the boiling temperature of the solvent at the pressure the conversion is conducted. Typically, conduct the conversion reaction at a temperature of 10 degrees Celsius (° C.) or higher, preferably 15° C. or higher, still more preferably 20° C. or higher, yet more preferably 22° C. or higher. The conversion reaction can be run at temperatures of 25° C. or higher, even 30° C. or higher and even 50° C. or higher.

Desirably, continue to agitate the dispersion throughout the reaction. It is also desirable to maintain the solids concentration in the dispersion at 15 weight-percent (wt %) or less, preferably 10 wt % or less, still more preferably 8 wt % or less and at the same time is it desirable to maintain the solids concentration in the dispersion at one wt % or more, preferably 3 wt % or more, still more preferably 5 wt % or more with wt % of solids based on combined weight of solids and solvent. The total reaction time is desirably at least five minutes, preferably 15 minutes or more, more preferably 30 minutes or more, yet more preferably 45 minutes or more and even more preferably 60 minutes or more. There is no known technical upper limit on the reaction time, but practically the reaction time is generally two hours or less.

Convert the H-CMC to lithium carboxymethyl cellulose (Li-CMC) by treating the H-CMC with lithium chloride. Generally, the H-CMC is isolated by filtration after completing the acidification of Na-CMC and a solution of lithium chloride is added to the isolated H-CMC. The solvent of the lithium chloride solution is typically a solvent as described for the conversion of Na-CMC to H-CMC. Desirably the aqueous component of the solvent is saturated with lithium chloride to maximize the amount of lithium chloride in the solution. The lithium chloride reacts with the H-CMC to form Li-CMC. The conversion of H-CMC to Li-CMC is desirably conducted at a temperature as described for the conversion of Na-CMC to H-CMC.

The Li-CMC can be isolated by removing the solvent phase. Preferably, the Li-CMC is washed with additional solvent to remove impurities. The Li-CMC can be dried to remove residual solvent. Drying can be done at an elevated temperature such as 50° C. or higher, 55° C. or higher, even 60° C. or higher. Generally, dry at a temperature of 105° C. or lower.

The process of the present invention provides a method for converting Na-CMC to Li-CMC without requiring use of a strong acid or the use of lithium hydroxide. In that regard, the process of the present invention can be free of strong acid, lithium hydroxide or both strong acid and lithium hydroxide. Moreover, the process of the present invention offers a means for high volume production of Li-CMC in contrast to small quantity production possible form exchange column processes.

The following example illustrates an embodiment of the present invention.

EXAMPLE

Disperse 50 grams (g) of Na-CMC (degree of substitution in a range of 0.6-2.0; for example, WALOCEL™ CRT 2000 PA, WALOCEL is a trademark of The Dow Chemical Company into 700 g of a solvent consisting of 50 volume percent (vol %) methanol, 50 vol % iso-propanol and 20 vol % purified water at approximately 23° C. Dropwise add 26.4 g glacial acetic acid to the dispersion and stir for one hour at approximately 23° C. to form a dispersion of H-CMC. Isolate the H-CMC from the solvent by filtration.

Form a solution of lithium chloride consisting of 50 vol % methanol, 30 vol % iso-propanol and 20 vol % purified water saturated with lithium chloride at a temperature of approximately 23° C. Disperse the isolated H-CMC into 700 grams of the lithium chloride solution. Stir the resulting dispersion for 15 minutes. Isolate solids from liquids by filtration. Again disperse the isolated solid into a lithium chloride solution, mix for 15 minutes and isolate by filtration. Repeat three times and isolate the product by filtration.

Wash the isolated product with 700 grams of a solvent (20 vol % water, 50 vol % methanol and 30 vol % isopropanol) and isolate by filtration. Repeat three times and isolate the final product by filtration. Dry the final product for 12 hours at 55° C. The final Li-CMC is water soluble. 80 percent of the carboxymethyl groups in the resulting Li-CMC have sodium ions replaced with lithium, as determined by ion exchange chromatography after acidic hydrolysis using 4 M $HNO_3$. The procedure for the ion exchange chromatography include adding 5 milliliters of HNO3 (4 moles per liter of deionized water) to 200 milligrams of Li-CMC in a 20 milliliter pressure tight vial. Herein, deionized water contains less than 0.01 milligrams per liter of sodium, potassium and lithium ions. Seal the vial with a crimp cap comprising a polytetrafluoroethylene coated septum. Heat the vial and its contents to 100 C, mix thoroughly by shaking and heat another 10 minutes at 100° C. Allow the vial and contents to cool to approximately 23° C. and transfer the vial contents to a 1 liter volumetric flask that is then filled with deionized water and use this solution for ion exchange chromatography after filter (syringe filter, 0.45 micrometer Nylon, FA. Nalgene, Art.-Nr. 196-2045). Conduct ion exchange chromatography according to the procedure set forth in the Product Manual for IonPac™ CG 12A and IonPac™ CS 12 A Columns by Thermo Scientific (IonPac is a trademark of Dionex Corporation). Conduct ion exchange chromatography with Suppressor technique and conductibility detector DX120 with autosampler using data system Chromeleon 6.3, precolumn (IonPac CB12A), separation column (IonPac CS12A), self-regenerating suppressor for cationics CSRS300 and sample bin for auto sampler (Polyvial 10 milliliters).

The WALOCEL CRT 2000 PA (238 grams per mole) has a 2% aqueous solution viscosity of 2130 milliPascals*seconds and the final Li-CMC (226 grams per mole) has a 2% aqueous solution viscosity of 3700 milliPascals*seconds.

What is claimed is:
1. A process comprising the following steps: (a) treating sodium carboxymethyl cellulose with a weak acid to form an acid form of carboxymethyl cellulose; and (b) treating the acid form of carboxymethyl cellulose with lithium chloride to form lithium carboxymethyl cellulose.

2. The process of claim 1, further characterized by the weak acid being selected from a group consisting of acetic acid, formic acid, hydrofluoric acid, nitrous acid, hydrocyanic acid and hydrogen sulfate ion.

3. The process of claim 1, further characterized by the weak acid being acetic acid.

4. The process of claim 1, further characterized by an absence of strong acid during the forming of carboxymethyl cellulose in step (a).

5. The process of claim 1, further characterized by the treatments of step (a) and step (b) being done in an aqueous solution.

6. The process of claim 5, further characterized by the aqueous solution comprising alcohol.

7. The process of claim 1, further characterized by the sodium carboxymethyl cellulose having a degree of substitution in a range of 0.4 to 2.0.

* * * * *